(12) United States Patent
Hurley

(10) Patent No.: US 11,451,393 B2
(45) Date of Patent: Sep. 20, 2022

(54) SYSTEM AND METHOD FOR DISTRIBUTED GENERAL-PURPOSE COMPUTING WITH CRYPTOTOKEN PAYMENT SYSTEM

(71) Applicant: Kenneth Hurley, Menlo Park, CA (US)

(72) Inventor: Kenneth Hurley, Menlo Park, CA (US)

( * ) Notice: Subject to any disclaimer, the term of this patent is extended or adjusted under 35 U.S.C. 154(b) by 329 days.

(21) Appl. No.: 16/775,638

(22) Filed: Jan. 29, 2020

(65) Prior Publication Data

US 2020/0244456 A1   Jul. 30, 2020

Related U.S. Application Data

(60) Provisional application No. 62/798,257, filed on Jan. 29, 2019.

(51) Int. Cl.

| | |
|---|---|
| *G06Q 20/32* | (2012.01) |
| *H04L 9/32* | (2006.01) |
| *H04L 9/06* | (2006.01) |
| *H04L 9/08* | (2006.01) |
| *G06Q 20/38* | (2012.01) |
| *G06Q 20/36* | (2012.01) |
| *H04L 9/00* | (2022.01) |

(52) U.S. Cl.
CPC .......... *H04L 9/3213* (2013.01); *G06Q 20/36* (2013.01); *G06Q 20/3829* (2013.01); *H04L 9/0643* (2013.01); *H04L 9/0894* (2013.01); *G06Q 2220/00* (2013.01); *H04L 9/50* (2022.05); *H04L 2209/56* (2013.01)

(58) Field of Classification Search
CPC .............. G06Q 20/36; G06Q 20/3829; G06Q 2220/00; H04L 9/0643; H04L 9/0894
USPC .......................................................... 705/64
See application file for complete search history.

(56) References Cited

U.S. PATENT DOCUMENTS

| | | | |
|---|---|---|---|
| 10,600,009 B1 * | 3/2020 | Augustine et al. | |
| 2019/0303579 A1 * | 10/2019 | Reddy et al. | |
| 2020/0201910 A1 * | 6/2020 | Gavaudan et al. | |
| 2020/0073698 A1 * | 7/2020 | Wu et al. | |
| 2022/0101318 A1 * | 2/2022 | Zhang et al. | |

FOREIGN PATENT DOCUMENTS

WO   WO2020142907   * 1/2019

* cited by examiner

*Primary Examiner* — James D Nigh
*Assistant Examiner* — Yin Y Choi
(74) *Attorney, Agent, or Firm* — Mark David Torche; Patwrite Law

(57) ABSTRACT

A system and method for distributed general-purpose computing with cryptotoken payment system provides a full system that integrates a slow Blockchain Cryptotoken with a fast Directed Acyclic Graph Blockchain Cryptotoken. The instant invention provides: (1) a hybrid Cryptocurrency/Cryptotoken system that allows for very fast transactions to happen decoupled from the slow transactions of normal Cryptocurrencies (2) a mechanism to verify the processing of data and payments to the End User's wallet for the processing of that data that can in turn be used for In App purchases or in game purchases of items and (3) mechanisms for the transfer of unprocessed and processed data to the client or customer.

20 Claims, 8 Drawing Sheets

SYSTEM AND METHOD FOR DISTRIBUTED GENERAL-PURPOSE COMPUTING WITH CRYPTOTOKEN PAYMENT SYSTEM

CROSS REFERENCE TO RELATED APPLICATIONS

This application claims priority and herein incorporates by reference U.S. provisional patent application 62/798,257, filed Jan. 29, 2019.

BACKGROUND OF THE INVENTION

Currently there are a number of solutions for high speed processing of transactions via a Blockchain Cryptotoken. Some of these solutions attempt to use different techniques to speed up the verification of transactions, but these solutions fail to meet the needs of the industry because they current systems verification of transactions take several seconds to several minutes. Other solutions attempt to solve this issue by using Directed Acyclic Graph Blockchain Cryptotokens, but these solutions are similarly unable to meet the needs of the industry because they aren't integrated with decentralized applications.

There is a need for a system and method of making cryptotoken payments operable within a comparable time frame taken by conventional payment methods and systems.

SUMMARY OF THE INVENTION

A system and method for distributed general-purpose computing with cryptotoken payment system provides a full system that integrates a slow Blockchain Cryptotoken with a fast Directed Acyclic Graph Blockchain Cryptotoken. The instant invention provides: (1) a hybrid Cryptocurrency/Cryptotoken system that allows for very fast transactions to happen decoupled from the slow transactions of normal Cryptocurrencies (2) a mechanism to verify the processing of data and payments to the End User's wallet for the processing of that data that can in turn be used for In App purchases or in game purchases of items and (3) mechanisms for the transfer of unprocessed and processed data to the client or customer.

It is desirable to have a system architecture with associated software that allows for the distribution of payments for the processing of data that utilizes unused cycles of Compute Devices and Chips. Furthermore, it is desirable to have a system and software that can be easily integrated into computer and mobile applications and games. Still further, it is desirable to have a system and software that allows the payments made to be converted to currency or in-app purchases. The disclosed system and associated software advantageously fill these needs and addresses the aforementioned deficiencies by providing a set of components to interface to computer and mobile devices apps and games to access a Cryptotoken and the compute devices.

Disclosed is a system together with an associated computer process. The system is made up of the following components: A Blockchain Cryptotoken component, Data Delivery/Storage component and a Processing component.

These components are connected as follows: The Blockchain Cryptotoken is used to receive payment for the processing of data. The Data Delivery/Storage component is used to store data before and after processing of the data. The Processing Component is used to process and return the processed data to the Data Delivery/Storage component. Once the data has been processed the Blockchain Cryptotoken is awarded to the device owner that has done the processing.

The associated computer process Is made up of the following executable steps, all of which are required in all versions: A customer sends or converts currency which is converted into Cryptotokens. The customer then sends the data that is to be processed to the Decentralized File System component and it is stored in the Delivery/Storage component.

The Processing Component then processes the data and returns the data to the Delivery/Storage Component. Upon successful verification of the work being performed, the Blockchain Cryptotoken releases the Cryptotokens to the End User's Wallet that processed data.

The system may also have one or more of the following optional components: Decentralized Website Component, which is a user facing input system, such as a decentralized website with web forms that allows a customer to interface to purchase processing of data.

The disclosed system is unique when compared with other known systems and solutions in that it provides a full system that integrates a slow Blockchain Cryptotoken with a fast Directed Acyclic Graph Blockchain Cryptotoken. Similarly, the software disclosed is unique when compared with other known solutions in that it provides a unique way for applications and games to utilize unused cycles from computing devices to earn Cryptotokens by processing real data, such as Artificial Intelligence or Machine Learning data. Typically, other Cryptocurrencies and Cryptotokens are earned by what is known as mining. Mining uses the computing devices to solve complex mathematical problems to verify a block on the Blockchain. This mining does not actually process real data and is only used as a competition to see who wins the mining payments.

The disclosed software is unique in that the overall architecture of the system is different from other known systems. More specifically, it provides: (1) a hybrid Cryptocurrency/Cryptotoken system that allows for very fast transactions to happen decoupled from the slow transactions of normal Cryptocurrencies (2) It provides for a mechanism to verify the processing of data and payments to the End User's wallet for the processing of that data that can in turn be used for In App purchases or in game purchases of items and (3) It provides mechanisms for the transfer of unprocessed and processed data to the client or customer. Similarly, the associated software is unique in that is incorporates interfaces that allow for applications and games to use unused cycles of one or more devices to process real data and to receive and utilize payments for the processing of data.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The System and Method for Distributed General-Purpose Computing with CryptoToken Payment System may, however, be embodied in many different forms and should not be construed as being limited to the embodiments set forth herein; rather, these embodiments are provided by way of illustration only and so that this disclosure will be thorough, complete and fully convey understanding to those skilled in the art.

Other features and advantages of the instant invention will become apparent from the following description of the invention which refers to the accompanying drawings.

DETAILED DESCRIPTION OF THE INVENTION

Figure 1:
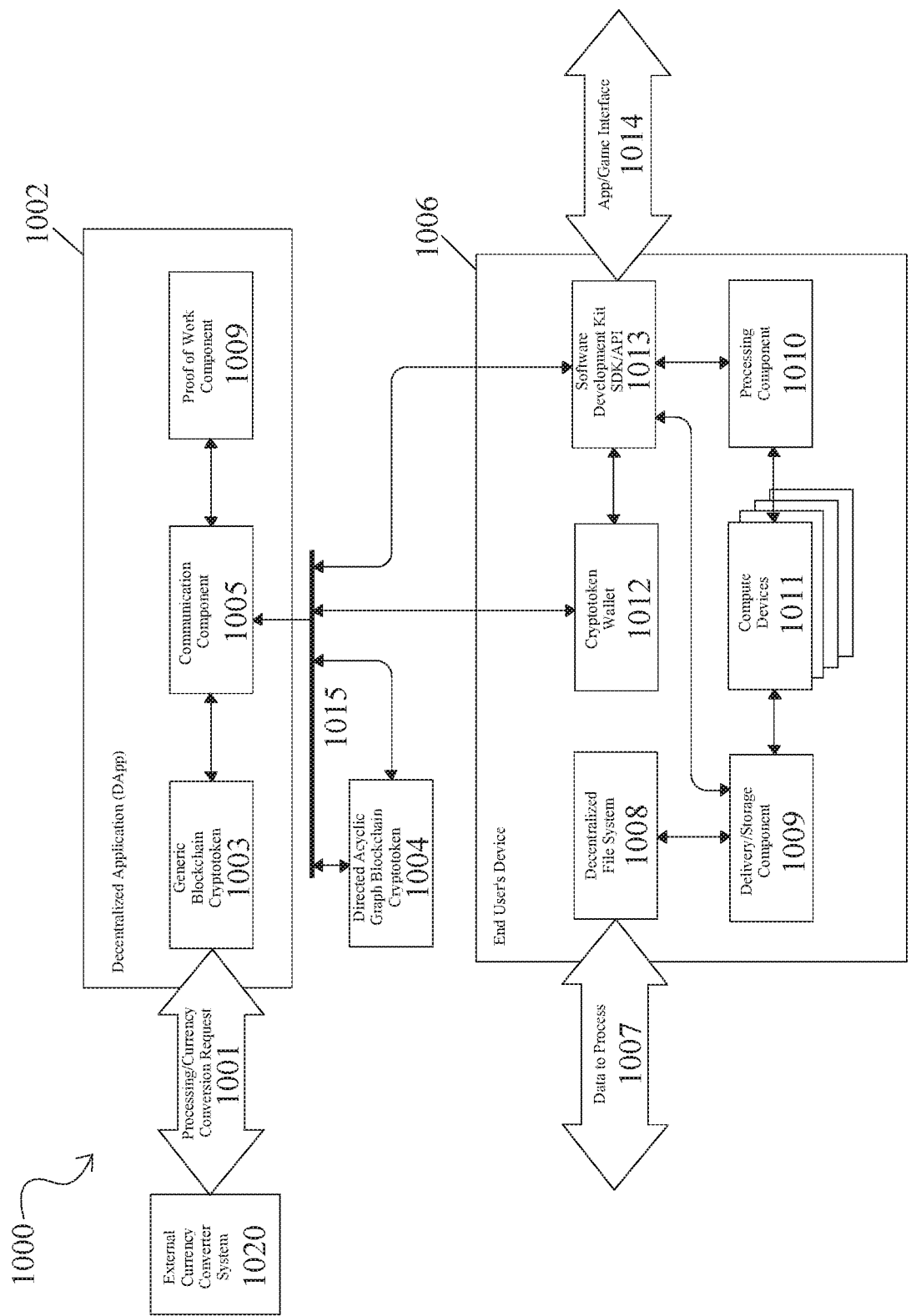
FIG. 1 is a schematic diagram of a distributed general-purpose computing system with cryptotoken payment system according to an embodiment of the invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Glossary of Terms

API Application Programming Interface
SDK Software Development Kit
DApp Decentralized Application
PoW Proof of Work
DAG Directed Acyclic Graph
CPU Central Processing Unit
GPU Graphics Processing Unit The present invention is directed to system and method for a Distributed General-Purpose Computing with Cryptotoken Payment System together with an associated computer process. The system is made up of the following components: a Generic Blockchain Cryptotoken component, a Directed Acyclic Graph Blockchain Cryptotoken component, a Payment System component, a Proof of Work component, a Decentralized File System component, a Data Delivery/Storage component, a Processing component, a Communication component, a Software Development Kit (SDK)/Application Programming Interface (API) component, a Cryptocurrency Wallet component and a Compute Devices component.

These components are connected as follows: the Generic Blockchain Cryptotoken component interfaces with the external Currency Converter system and is connected to the Proof of Work component and the Directed Acyclic Graph Blockchain Cryptotoken component. The Proof of Work component is connected to Communication component. The Directed Acyclic Graph Blockchain component is also connected to the Communication component. The Communication component is also connected to the Cryptotoken Wallet component and the Software Development Kit SDK/API component. The Decentralized File System Component interfaces with data to process and is connected to the Delivery/Storage component. The Cryptotoken Wallet component is connected to the Communications component and the Software Development Kit component SDK/API and interfaces with the external App/Game Interface system. The Delivery/Storage component is connected to the Software Development Kit component SDK/API and interfaces with the external Compute Devices. The processing component interfaces with Compute Devices and is connected to the Software Development Kit component SDK/API.

The associated computer process Is made up of the following executable steps, all of which are required in all versions: A customer pays currency into a converter system that converts the amount of currency into Cryptotoken and sends the transaction to the Generic Blockchain Cryptotoken component which holds the payment in escrow and the work data set that is to be processed is sent to the Decentralized File System component and is stored in the Delivery/Storage component.

The processing request includes the Decentralized File System components location and a Generic Blockchain Cryptotoken deposit account. The Generic Blockchain Cryptotoken component calculates out the cost of the processing and puts that amount of Cryptotoken on escrow for processing. The Generic Blockchain Cryptotoken component then deposits into the Directed Acyclic Graph Blockchain component equivalent amounts of the Directed Acyclic Graph Blockchain Cryptotoken into the Directed Acyclic Blockchain. The Directed Acyclic Graph Blockchain Cryptotoken component then sends the processing request to the Communication component that distributes the work data set to a multitude of End User Devices for processing through the Software Development Kit.

The Software Development Kit component then sends the request to the Processing component. The processing component then communicates with the Compute Devices to process the work data set. The Compute Devices process the work data set and sends the processed work data to the Delivery/Storage component and signals back to the Processing component the completion of the processing. The processing component then signals back to the Software Development Kit component that the processing is completed. The Software Development Kit component then signals back to the Communication component that processing is done for the one device.

When all processing is reported back to the Communication component it sends a signal back to the Proof of Work component that verifies the integrity of the processed work data and then signals the Generic Blockchain Cryptotoken component to release the hold on the Generic Blockchain Cryptotoken that was held in escrow. The Generic Cryptotoken then sends a signal to the Directed Acyclic Graph Blockchain token to release Cryptotokens to the End User's Cryptotoken Wallet.

FIG. 1 is a schematic diagram that illustrates a Distributed General-Purpose Computing System with Cryptotoken Payment System 1000. In some embodiments, Distributed General-Purpose Computing System with Crypto-Token Payment System 1000 may also be referred to as, for example, but not limited to, a Cryptocurrency payment system for General Compute Devices, a Decentralized Crypto Payment system for Computing, etc.

As shown in FIG. 1, a Distributed General-Purpose Computing System 1000 includes a Decentralized Application (DApp) 1002, an End User's Device 1006 and a Directed Acyclic Graph Blockchain Cryptotoken Component 1004. Decentralized Application (DApp) 1002 is in communication with End User's Device 1006 and Directed Acyclic Graph Blockchain Cryptotoken 1004 through a Communication Component 1005 and via a network 1015. Network 1015 may be any type of network (e.g., a local area network (LAN), a wide area network (WAN), a virtual network, a telecommunications network, a cellular network, a wireless LAN (WLAN), etc.) configured to enable communication between Decentralized Application 1002, Directed Acyclic Graph Blockchain Cryptotoken component 1004 and End User's Device 1006. Network 1015 can be implemented as a wired network and/or wireless network, or any other communication system such as Bluetooth, NFC, etc.

Decentralized Application 1002 contains three components, a Generic Blockchain Cryptotoken component 1003, Communication Component 1005 and a Proof of Work component 1009. End User's Device 1006 has six components, a Decentralized File System 1008, a Cryptotoken Wallet 1012, a Software Development Kit SDK/API 1013, Delivery/Storage component 1009 and a Processing component 1010. Directed Acyclic Graph Blockchain Cryptotoken 1004 is a stand-alone component.

Generic Blockchain Cryptotoken component 1003 receives a Processing/Currency Conversion Request 1001 from an outside system. Processing/Currency Conversion Request 1001 can be initiated from any number of systems, including Web Applications, other Decentralized Applications (DApps), Computer Applications and any other systems that can interface to a Generic Blockchain Cryptotoken system. Currency Conversion Request 1001 is communicated to Decentralized Application 1002 and Generic Blockchain Cryptotoken component 1003. Data to be processed 1007 is also communicated End User's Device 1006 and Decentralized File System 1008. Currency Conversion Request 1001 and Data to Process 1007 communication may be done in parallel.

One or more End User's Device receives data to be processed via an outside system. Data to Process 1007 can be initiated from any number of systems including Web Application uploads, File System transfers via ftp, or even a simple URL pointer to the data. Decentralized File System 1008 component then stores that data in one or more End User's Devices 1006 for access.

An App/Game Interface 1014 is an external system that communicates with Software Development Kit SDK/API 1013. App/Game Interface 1014 external system communicates a hybrid set of compute instructions to Software Development Kit SDK/API 1013. One embodiment of the hybrid set of compute instructions are called Shaders. Other embodiments include CPU instructions, ASIC instructions, etc. and are dependent on the type of Compute Device being utilized and the instructions that are native to that Compute Device and how the commands are communicated to the Compute Devices as is known in the art. Software Development Kit SDK/API 1013 then forwards the hybrid set of compute instructions to Processing component 1010, which stores the instructions for later use.

After Currency Conversion Request 1001 and Data to Process 1007 is communicated to Decentralized Application 1002 and Generic Blockchain Cryptotoken component 1003. The request contains the address of the data to be processed that was sent Decentralized File System 1008. Generic Blockchain Cryptotoken component 1003 then uses Communication Component 1005 to communicate to Directed Acyclic Graph Blockchain Cryptotoken 1004 component to instantiate Cryptotokens and then signals Software Development Kit SDK/API 1013 to start processing the request.

Upon Software Development Kit SDK/API 1013 receiving the request for processing, Software Development Kit SDK/API 1013 communicates to Delivery/Storage Component 1009 to transfer the data to be processed from Decentralized File System 1008 to one or more Compute Devices 1011. Software Development Kit SDK/API 1013 then signals Processing component 1010 that processing is ready. Processing Component 1010 then instantiates the hybrid set of compute instructions inside one or more Compute Devices 1011.

App/Game Interface 1014 sends a signal to Software Development Kit SDK/API 1013 that the current data has been processed. App/Game Interface 1014 can signal with events such as end of frame while running a game or end of processing while running an application. These events signal Software Development Kit SDK/API 1013 to message Delivery/Storage Component 1009 to extract processed data from one or more Compute Devices 1011. Delivery/Storage Component 1009 then places the processed data in Decentralized File System 1008. Software Development Kit SDK/API 1013 then communicates through Communication Component 1005 to Proof of Work Component 1009 that the processing is completed and the address in Decentralized File System 1008 of the processed data.

Upon receiving one or more data processed messages Proof of Work Component 1009 verifies the data was actually processed correctly. Once Proof of Work Component 1009 verifies that the data is valid for one or more End User's Devices 1006 involved in the processing transaction it sends a message through Communication Component 1005 to Generic Blockchain Cryptotoken 1003 to release the escrow in the contract. Generic Blockchain Cryptotoken 1003 then marks the associated transaction complete and releases the Generic Blockchain Cryptotokens to End User's Device Cryptotoken Wallet 1012. Generic Blockchain Cryptotoken 1003 then communicates through Communication Component 1005 to Directed Acyclic Graph Blockchain Cryptotoken 1004 that processing is finished so that it can do cleanup or pruning of the blockchain.

Figure 2:
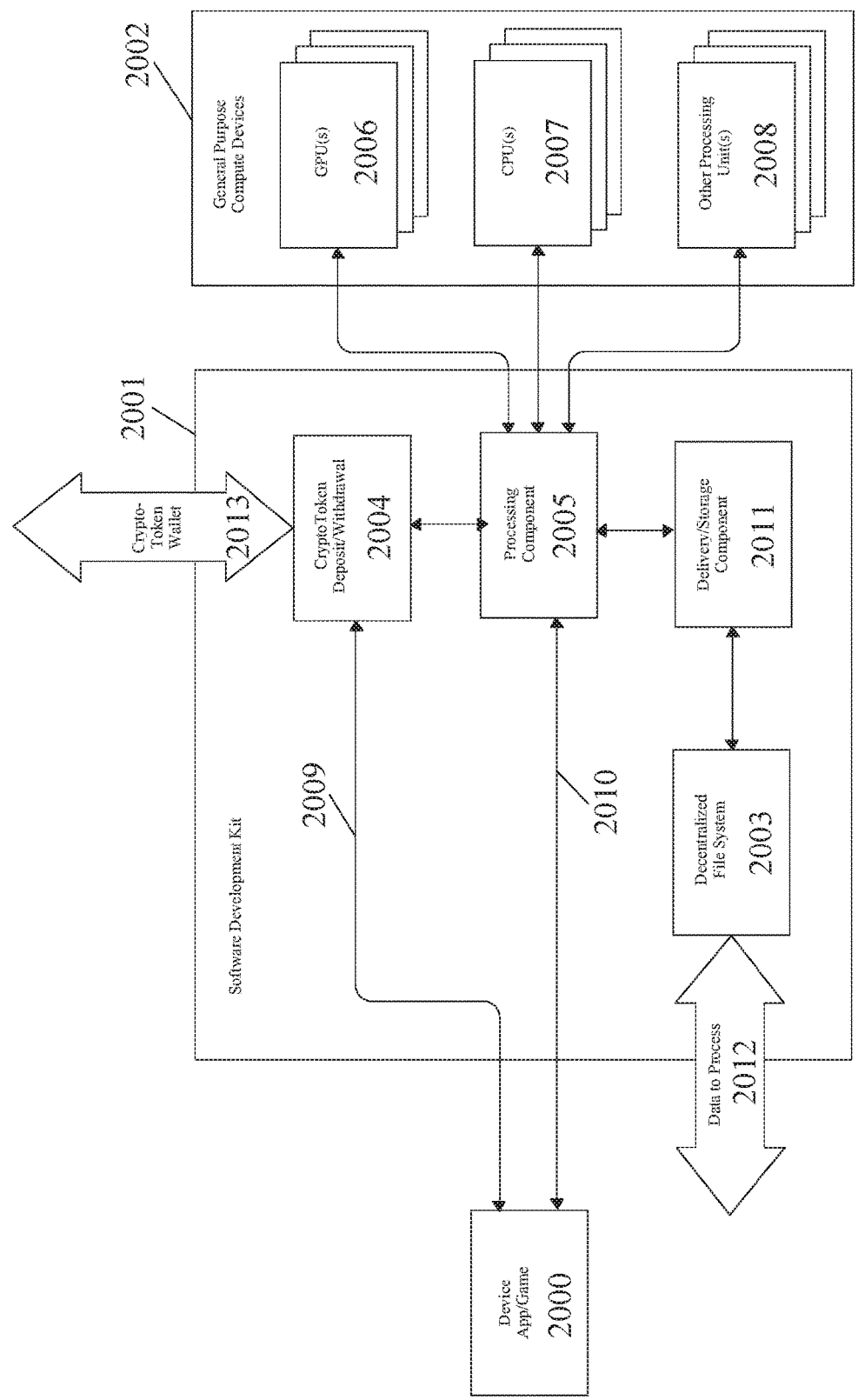
FIG. 2 is a schematic diagram of the internal components of a Software Development Kit.

FIG. 2 is a schematic diagram of the internal components of a Software Development Kit 2001 and a first Application Programming Interfaces (API) 2009 and a second API 2010. General-Purpose Compute Devices 2002 are a representation of any type of computing device. These can include Graphics Processing Units (GPU(s)) 2006, Central Processing Units (CPU(s)) 2007 and other types Processing Units 2008. A Device App/Game 2000 is connected to Software Development Kit 2001 via Application Programming Interfaces (API) 2009 and 2010.

First API 2009 is the interface to a Cryptotoken Deposit/Withdrawal 2004 component. This gives Device App/Game 2000 the ability to deposit and withdraw Cryptotokens to an external component Cryptotoken Wallet 2013.

Second interface 2010 is the interface that Device App/Game 2000 uses to setup and execute processing of data. A Processing Component 2005 communicates to a Delivery Storage Component 2011 which retrieves data from a Decentralized File System 2003 component. This data was previously sent by a client or customer via an outside system, Data to Process 2012. Processing Component 2005 then sends a hybrid instruction set to General-Purpose Computing Devices 2002 that are available for processing. Processing Component 2005 also transfers the data to be processed between General-Purpose Computing Devices 2002. Device App/Game 2000 then executes its normal process which executes the hybrid instruction set that processes the data.

At set intervals Device App/Game 2000 signals to Processing Component 2005 that the data has been processed.

Processing Component 2005 then retrieves the process data from General-Purpose Computing Devices 2002 and sends the data to Delivery/Storage Component 2011. Delivery/Storage Component 2011 then delivers the processed data to the client or customer via Decentralized File System 2003.

Figure 3:
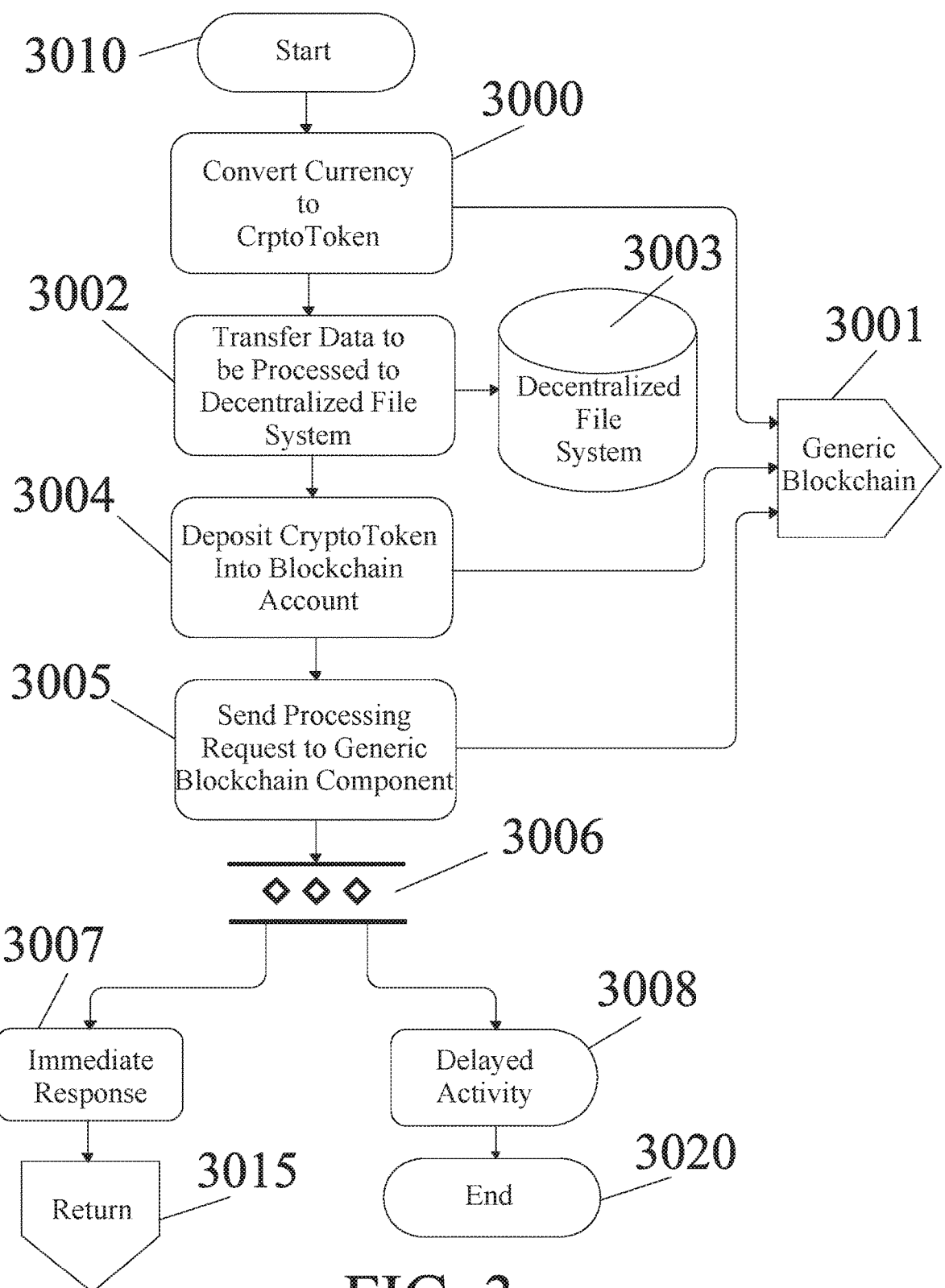
FIG. 3 is a flow diagram of a typical client or customer transaction.

FIG. 3 is a flow diagram of a typical client or customer transaction. A customer or client starts the process 3010 by converting any currency to a Cryptotoken 3000. This token is sent to a Generic Blockchain 3001.

Currency Conversion step 3000 is communicated to Generic Blockchain Cryptotoken component 3001. Generic Blockchain Cryptotoken component 3001 verifies payment via normal blockchain transaction verification systems. Generic Blockchain Cryptotoken component 3001 then stores or adds to the balance in what is known as a contract, inside Cryptotoken component 3001 within the address of a transaction block of a blockchain.

The client or customer then sends the data to be processed to Decentralized File Systems 3002, 3003. This step and Currency Conversion step 3000 can be done synchronously or asynchronously. The system then deposits the Cryptotokens into the into a specific transaction ID for the customer/client 3004. The customer then sends the address of the data to be processed and a request to process the data to a Generic Blockchain component 3005. The processing of data can be done asynchronously or synchronously 3006. If the processing is synchronous an Immediate response 3007 is returned 3015. In this system asynchronous processing of the data will be most common form of processing and will result in delayed activity 3008 for the signal that the data was processed and then end 3020.

Processing Request 3005 is made to Generic Blockchain Cryptotoken component 3001. Generic Blockchain Cryptotoken component 3001 then calculates the amount of Cryptotokens that are necessary to do the processing request and if that amount is available in the contract, it moves that amount of Cryptotokens into an escrow entry within the blockchain and assigns a new transaction ID for that escrow entry.

Figure 4:
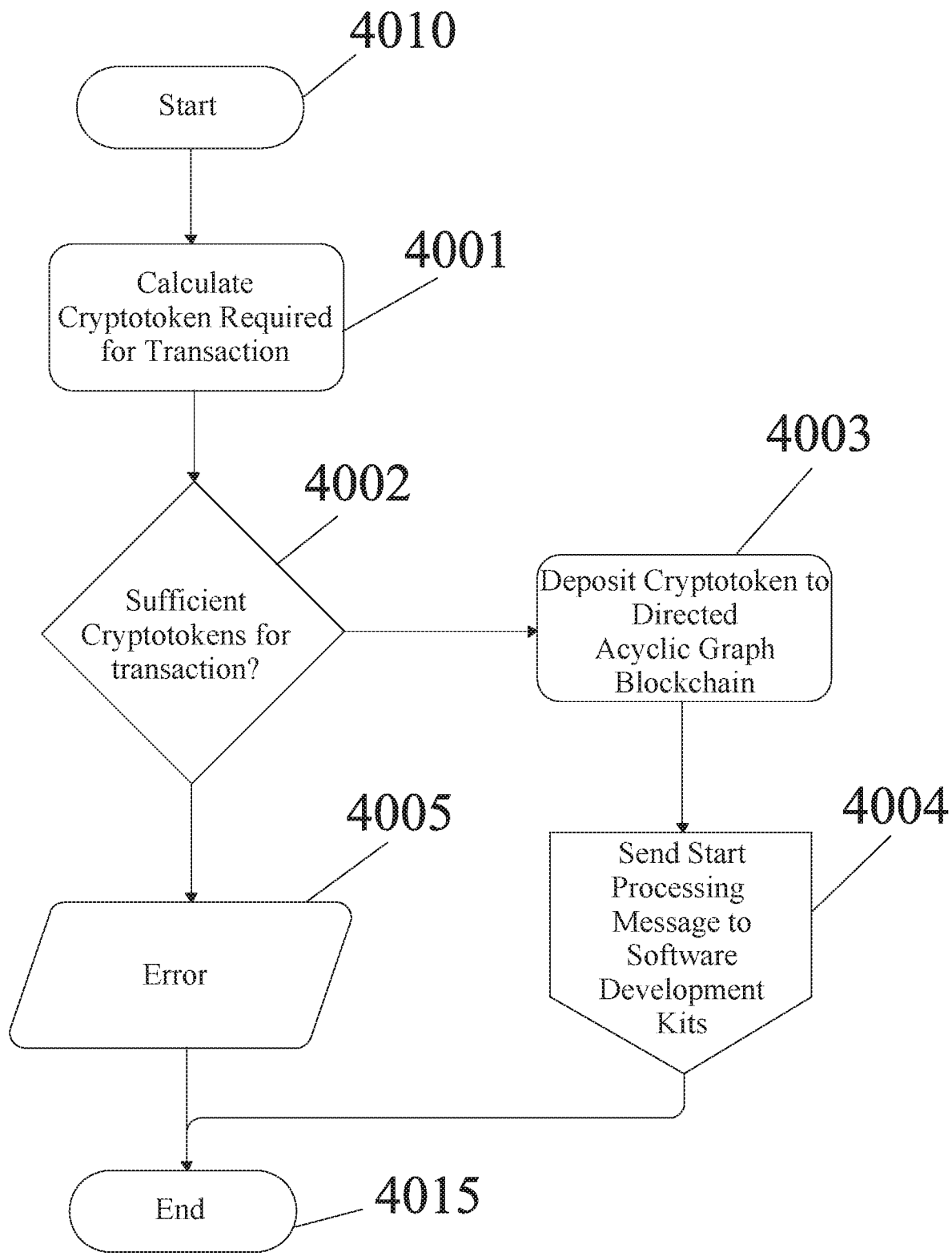
FIG. 4 is a flow diagram of the internal workings of the processing request inside a Decentralized App.

Referring to FIGS. 1 and 4, a flow diagram of the internal workings of the processing request inside Decentralized App (DApp) 1002 is shown. DApp 1002 starts 4010 by calculating the amount of Cryptotokens required for this transaction 4001. The calculation uses the amount of processing power needed and the size of the data to process in determining the amount of Cryptotoken needed on deposit to execute a transaction 4002. If there are sufficient Cryptotokens available, the Cryptotokens are deposited into a Directed Acyclic Graph Blockchain 4003. DApp 1002 then sends the processing request to a Software Development Kit/API 4004. If there are not enough Cryptotokens available, then the process reports an error 4005 and the process ends 4015.

Figure 5:
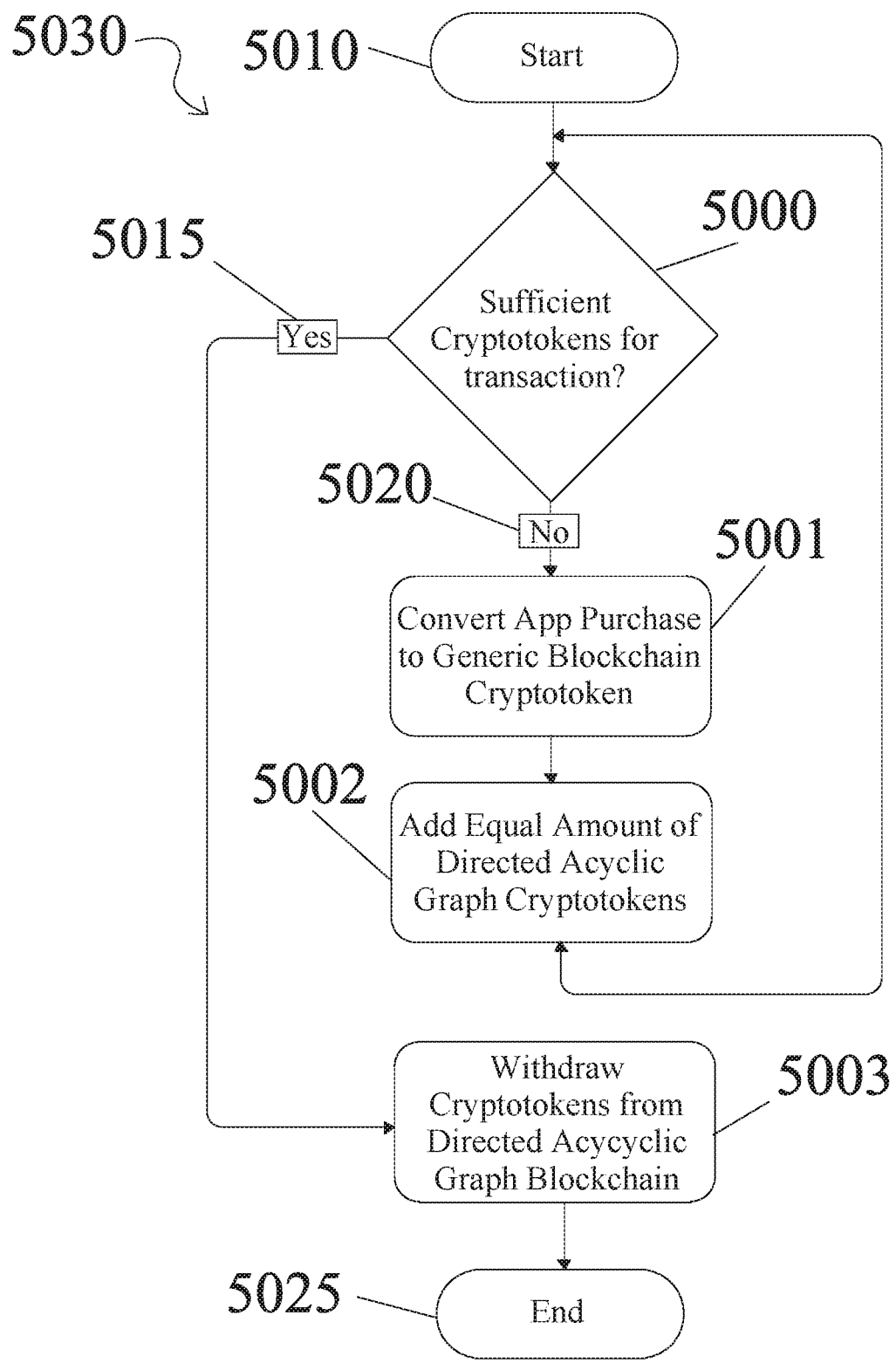
FIG. 5 is a flow diagram of how an Application or Game (App/Game) would use the Cryptotokens for in-app or in game purchases.

FIG. 5 is a flow diagram of how an Application or Game (App/Game) 5030 might use the Cryptotokens for in-app or in game purchases. The process starts 5010 and The App/Game 5030 first checks the wallet of the user or play to see if there are sufficient Cryptotokens for the transaction 5000. If there are enough Cryptotokens 5015, a withdrawal from the Wallet is made 5003. If there are not enough Cryptotokens 5020, the user can add Cryptotokens by making an in-app or in game purchase that will deposit a certain percentage into the Generic Blockchain 5001 and then add equal amounts to the Directed Acyclic Cryptotokens 5002 via a Cryptotoken wallet and then rechecking the amount of Cryptotokens and then ending the process 5025.

Figure 6:
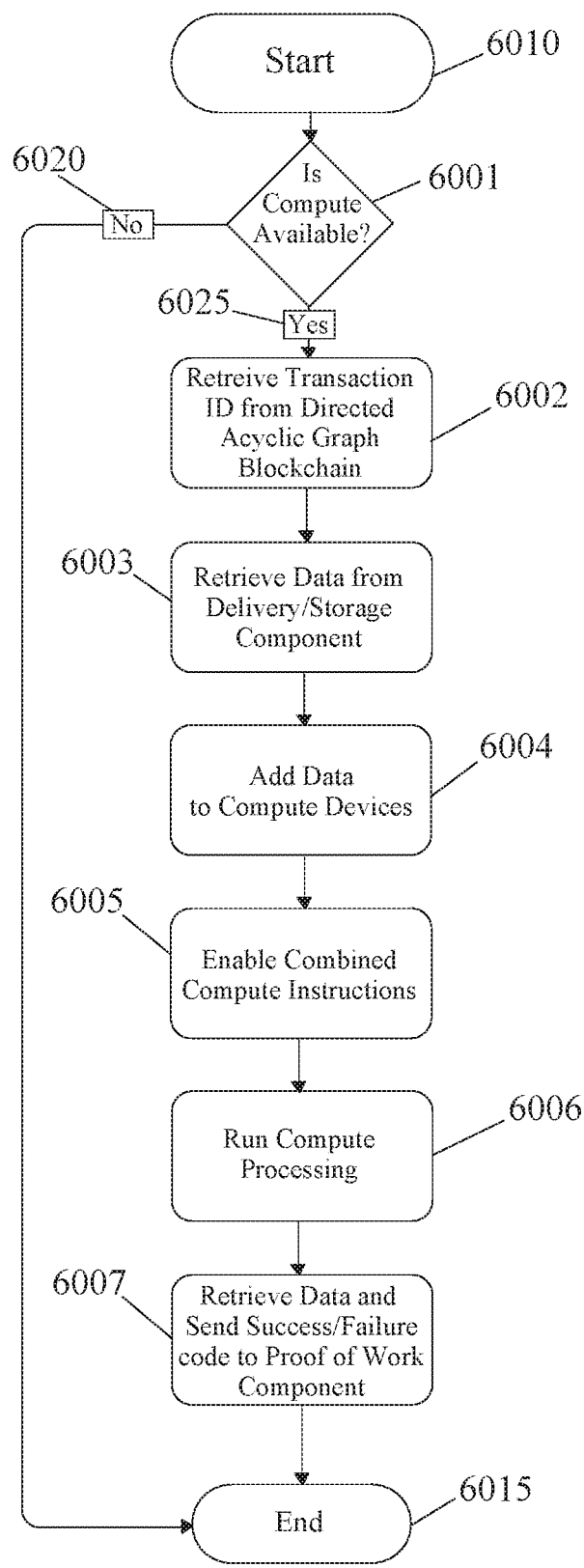
FIG. 6 is a flow diagram of the processing of data flow.

FIG. 6 is a flow diagram of the processing of data flow. The process starts 6010 by checking to make sure sufficient compute devices are available for processing of data 6001. If not 6020, the flow ends 6015 immediately. If sufficient compute devices exist, 6025, the process retrieves the transaction ID from the Directed Acyclic Graph Blockchain system 6002. The process then retrieves the data from the Delivery/Storage Component 6003. The process then adds the data to the Compute Devices for processing 6004.

The App/Game then sends the hybrid instruction set to the Software Development Kit API which enables the Combined Compute Instructions 6005. When the App/Game does its normal processing, the hybrid Compute Instructions are executed 6006. The process then retrieves the processed data from the compute device(s) and signals the Proof of Work Component that the processing is complete for this End Users Devices 6007 and then ends 6015.

Figure 7:
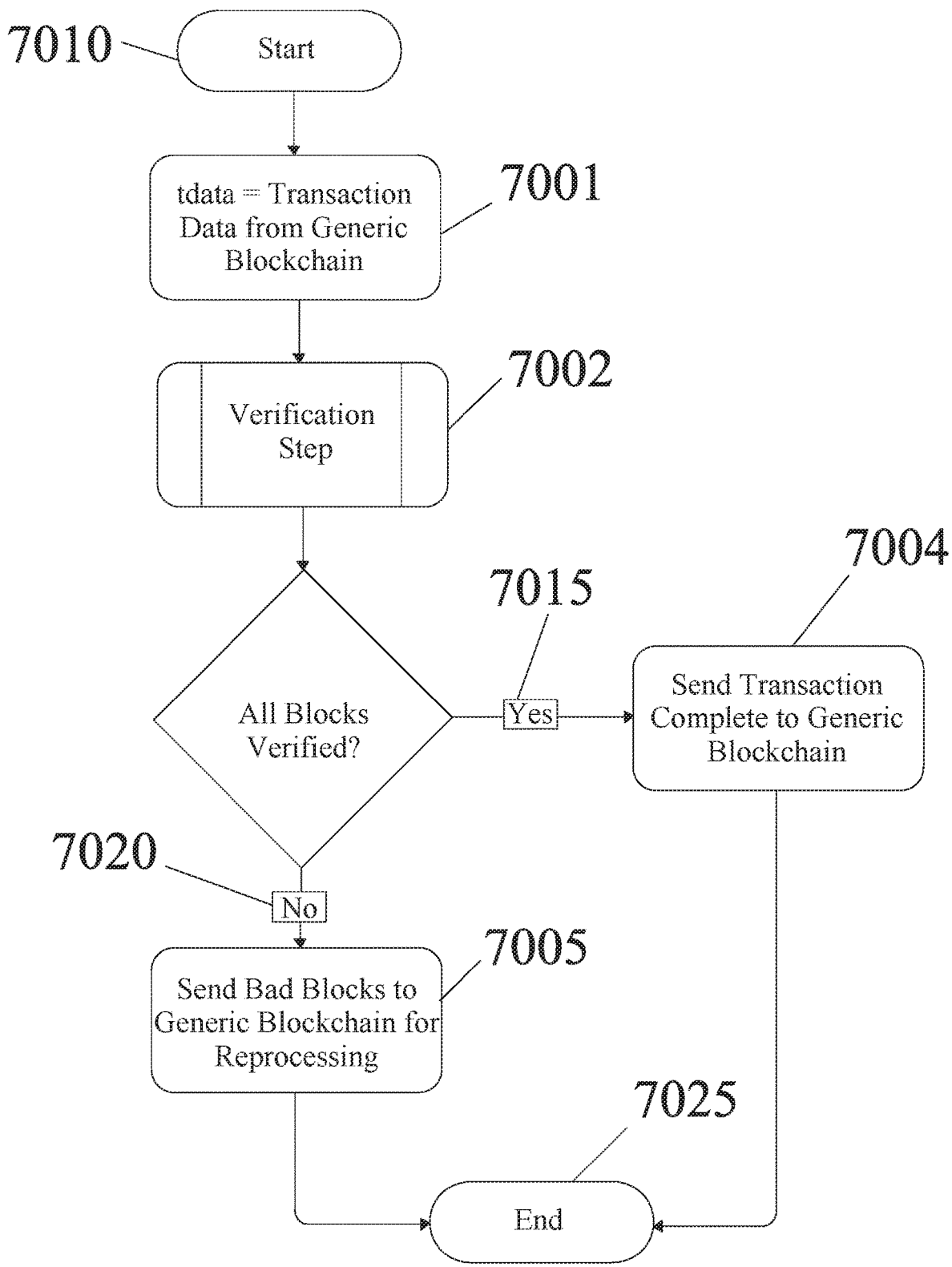
FIG. 7 is a flow diagram of the verification step that all data was really processed.

FIG. 7 is a flow diagram of the verification step that checks to see that all data was really processed. This is also known as "Real Proof of Work". The starts 7010 when the process first retrieves a Transaction data from the Generic Blockchain 7001 as tdata. It then sends tdata to a Verification Step 7002. If the Verification step returns that all blocks are verified 7015, it then sends a message to the Generic Blockchain that the transaction has completed successfully 7004 and then the process ends 7025. If all blocks have not been verified 7020, the process then sends the bad blocks back to the Generic Blockchain for reprocessing 7005 and then ends 7025.

Figure 8:
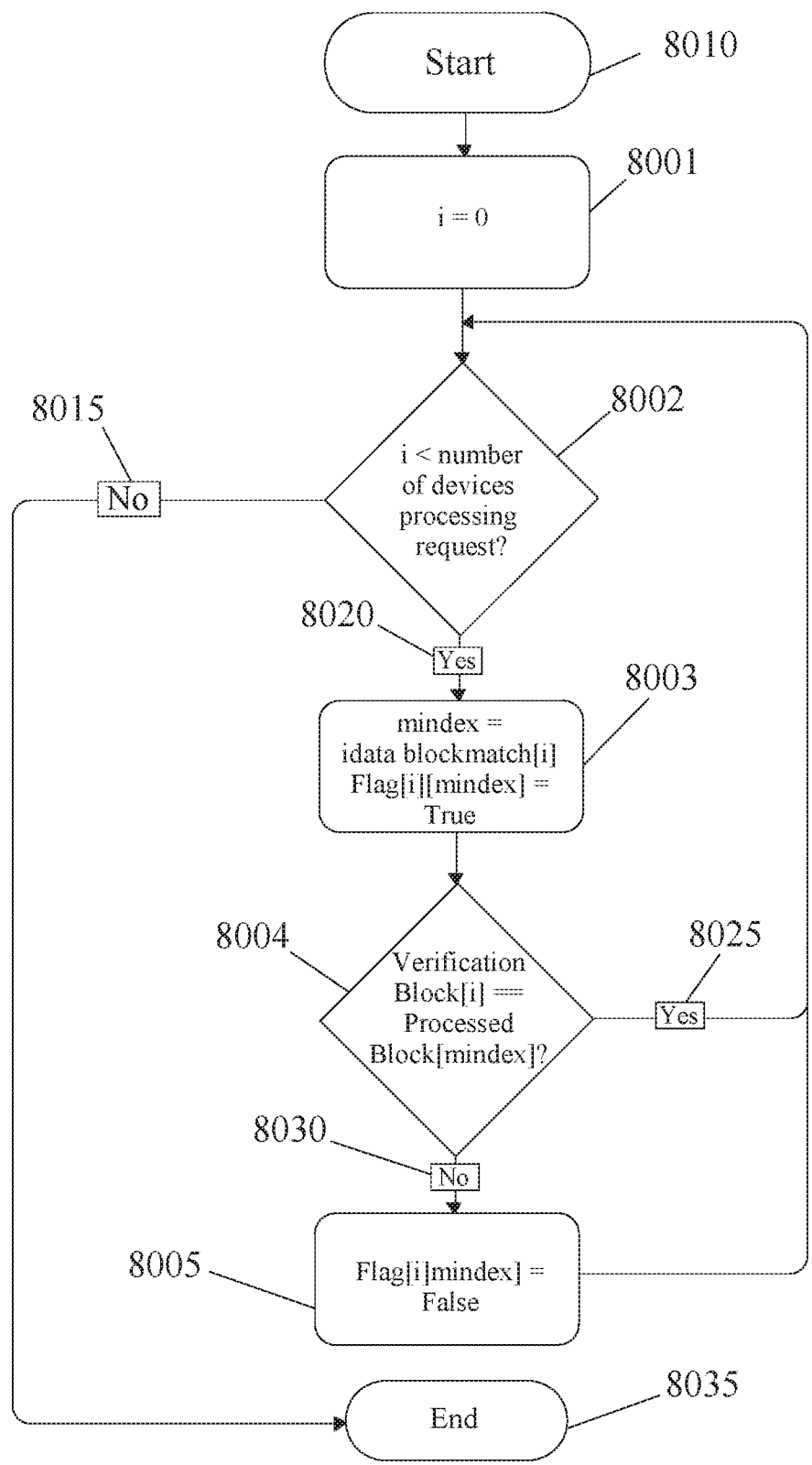
FIG. 8 is a flow diagram of the verification step that verifies all blocks of a transaction request to process data.

FIG. 8 is a flow diagram of the verification step that verifies all blocks of a transaction request to process data. For each of the number of processing requests a random block is checked from the verification device. A verification device is a random End User Device that is chosen that receives a block from each of the other End User Devices and runs the processing of those blocks for verification starting the process 8010. A counter 'i' is set to 0 as the first block index to check 8001. A check is made for counter 'i' is less than the number of devices involved in the processing request 8002. If yes 8020, 'i' is used to index into a table of indexes that correspond to the random block that was chosen to verify of a device's processed data and that device is set to verified 8003. The checksum of the verification block is checked against the random block 8004. If the verification block checksum is equal to the system loops to checking the next device that processed data 8025. If the verification fails 8030, a table index is marked as false for the failed device 8005. The process continues to verify all the devices random verification blocks. If all the devices have been checked, the return value is an array of device verification pass or failure flags. If no 8015, the process ends.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Although the instant invention has been described in relation to particular embodiments thereof, many other variations and modifications and other uses will become apparent to those skilled in the art.

What is claimed is:

1. A system for distributed general-purpose computing with cryptotoken payment system interconnected through a communication network comprising: an electronic computing device; said electronic computing device having memory, processor, and input and output interfaces; said electronic computing device executes computer code when directed by said processor; a generic blockchain cryptotoken component; a directed acyclic graph blockchain cryptotoken component; a payment system component; a proof of work component; a decentralized file system component; a data delivery/storage component; a processing component; a communication component; a software development kit/application programming interface component; a cryptotoken wallet component; a compute devices component; said generic blockchain cryptotoken component interfaces with an external currency converter system; and one or more central processing units to; accept a pay request from a customer; said pay request adapted to: convert said pay request into a cryptotoken; send said cryptotoken to said generic blockchain cryptotoken component whereby said cryptotoken is placed in escrow; send a processing request including a work data set to be processed to said decentralized file system component and storing said work data set in said delivery/storage component; wherein said processing request includes a location of said decentralized file system components and a generic blockchain cryptotoken deposit account; calculate a processing cost in cryptotoken using said generic blockchain cryptotoken component and place a cryptotoken processing cost on hold; deposit an equivalent amount of said cryptotoken processing cost into said directed acyclic graph blockchain cryptotoken component send said processing request from said directed acyclic graph blockchain cryptotoken component to said communication component; distribute said work data set to said compute devices for processing through said software development kit; whereby said processing request is sent to said processing component; process said work data set in said compute devices; wherein said compute devices comprises a plurality of end user devices; send processed data to said data delivery/storage component; signal said processing component that processing is complete; signal said software development kit that processing is complete; signal said communication component that processing is complete from each one of said plurality of end user devices; wherein a processing complete message is reported to said communication component when all processing is done; signal said proof of work component wherein the integrity of said work data processing is verified; signal said generic blockchain cryptotoken component to release said escrow in said generic blockchain; and signal said directed acyclic graph blockchain cryptotoken component to release cryptotokens to said cryptotoken wallet.

2. The system according to claim 1 wherein said communication network is an Internet connected network.

3. The system according to claim 1 wherein said directed acyclic graph blockchain cryptotoken component is a stand-alone component.

4. The system according to claim 1 wherein said pay request and said processing request are carried out in parallel.

5. The system according to claim 1 wherein said software development kit electronically transmits a hybrid set of compute instructions to said processing component.

6. The system according to claim 1 wherein a signal is sent to said directed acyclic graph blockchain cryptotoken component after processing is complete to cleanup said generic blockchain.

7. The system according to claim 1 wherein said compute devices are general purpose computing devices.

8. The system according to claim 7 where said general purpose computing devices are selected from the group consisting of graphics processing units, central processing units and other processing units.

9. The system according to claim 1 wherein said cryptotoken wallet component is an external cryptotoken wallet component.

10. The system according to claim 1 wherein said work data set is processed synchronously.

11. The system according to claim 1 wherein said work data set is processed asynchronously.

12. A method for distributed general-purpose computing with cryptotoken payment system interconnected through a communication network; the method comprising the steps of: accepting a pay request from a customer; converting said pay request into a cryptotoken; sending said cryptotoken to a generic blockchain cryptotoken component whereby said cryptotoken is placed in escrow; sending a processing request including a work data set to be processed by a decentralized file system component and storing said work data set in a delivery/storage component; wherein said processing request includes a location of said decentralized file system component and a generic blockchain cryptotoken deposit account; calculating a processing cost in cryptotoken using said generic blockchain cryptotoken component and place a cryptotoken processing cost on hold; depositing an equivalent amount of said cryptotoken processing cost into a directed acyclic graph blockchain cryptotoken component, sending said processing request from said directed acyclic graph blockchain cryptotoken component to a communication component; distributing said work data set to compute devices for processing through a software development kit; whereby said processing request is sent to a processing component; processing said work data set in said compute devices; wherein said compute devices comprises a plurality of end user devices; sending processed data to a data delivery/storage component; signaling said processing component that processing is complete; signaling said software development kit that processing is complete; signaling said communication component that processing is complete from each one of said plurality of end user devices; wherein a processing complete message is reported to said communication component when all processing is done; signaling a proof of work component wherein the integrity of said work data processing is verified; signaling said generic blockchain cryptotoken component to release said escrow in said generic blockchain cryptotoken component; and signaling said directed acyclic graph blockchain cryptotoken component to release cryptotokens to a cryptotoken wallet.

13. The method according to claim 12 wherein said directed acyclic graph blockchain cryptotoken component is a stand-alone component.

14. The method according to claim 12 wherein said pay request and said processing request are carried out in parallel.

15. The method according to claim 12 wherein a signal is sent to said directed acyclic graph blockchain cryptotoken component after processing is complete to cleanup said generic blockchain.

16. The method according to claim 12 wherein said compute devices are general purpose compute devices.

17. The method according to claim 16 where said general purpose compute devices are selected from the group consisting of graphics processing units, central processing units and other processing units.

18. The method according to claim 12 wherein said cryptotoken wallet is an external cryptotoken wallet.

19. The method according to claim 12 wherein said work data set is processed synchronously.

20. The method according to claim 12 wherein said work data set is processed asynchronously.

\* \* \* \* \*